US012146512B2

(12) United States Patent
Akhare et al.

(10) Patent No.: US 12,146,512 B2
(45) Date of Patent: Nov. 19, 2024

(54) TWO PORT HYDRAULIC RAM OPERATION WITH LOCKING/UNLOCKING METHOD

(71) Applicant: WORLDWIDE OILFIELD MACHINE, INC., Houston, TX (US)

(72) Inventors: Prashant N Akhare, Cypress, TX (US); Rahul Patil, Tomball, TX (US)

(73) Assignee: WORLDWIDE OILFIELD MACHINE, INC., Houston, TX (US)

( * ) Notice: Subject to any disclaimer, the term of this patent is extended or adjusted under 35 U.S.C. 154(b) by 0 days.

(21) Appl. No.: 18/488,339

(22) Filed: Oct. 17, 2023

(65) Prior Publication Data

US 2024/0255009 A1 Aug. 1, 2024

Related U.S. Application Data

(60) Provisional application No. 63/441,380, filed on Jan. 26, 2023.

(51) Int. Cl.
*F15B 15/14* (2006.01)
*F15B 15/26* (2006.01)

(52) U.S. Cl.
CPC .............. *F15B 15/14* (2013.01); *F15B 15/26* (2013.01)

(58) Field of Classification Search
CPC .. E21B 33/063; E21B 34/102; F16K 31/1225; F15B 15/14; F15B 15/26
See application file for complete search history.

(56) References Cited

U.S. PATENT DOCUMENTS

| | | | | |
|---|---|---|---|---|
| 2012/0055679 | A1* | 3/2012 | Van Winkle .......... | E21B 33/063 166/55 |
| 2017/0107779 | A1* | 4/2017 | Akhare ................. | E21B 33/063 |
| 2019/0153802 | A1* | 5/2019 | Rao ..................... | E21B 33/0355 |

* cited by examiner

*Primary Examiner* — Abiy Teka
(74) *Attorney, Agent, or Firm* — Kenneth L. Nash; Thomas D. Nash

(57) ABSTRACT

A hydraulic method for opening and closing a ram and operating a wedge lock and unlock mechanism using only an open port and a close port. To close the rams and lock the rams in a closed position, hydraulic fluid is directed to the close port where the rams close and then are locked in the closed position. To open the rams, hydraulic fluid is direct to the open port whereupon the wedge locks are unlocked. Afterward the wedge locks are unlocked, hydraulic fluid is utilized to open the rams.

18 Claims, 4 Drawing Sheets

Closed Position

TWO PORT HYDRAULIC RAM OPERATION WITH LOCKING/UNLOCKING METHOD

BACKGROUND OF THE INVENTION

The present invention relates generally to a method for hydraulic ram operation, and more specifically, to a hydraulic method for ram opening/closing and wedge locking/unlocking using only an open port and a close port.

Rams are available that utilize a wedge to lock the ram in the closed position. An angled wedge is pressed against an angled end of the tail rod of the ram shaft to secure the rams from moving. In this way, if hydraulic fluid power is lost the rams cannot move to prevent loss of the seal.

Rams are typically operated by a close and open port to move the rams between the open and closed position. However, in a ram system like the prior art, the wedge locks are operated with a different set of ports and utilize two cam operated valves as part of the operation of the wedge locks. In other words, the prior art systems have additional hydraulic fluid ports other than the open and close ports. However this means additional hydraulic lines are required to operate the rams. It would be desirable to be able to operate the rams and the two cam operated valves with only two lines-namely the open and close ports. Those of skill in the art will appreciate the present invention which does this.

SUMMARY OF THE INVENTION

An objective of the invention is to provide an improved hydraulic control system which allows operation of the rams, wedge locks, and cam actuated control valve with only two hydraulic line that correspond to the open and close ports on the ram.

Another objective of the invention is to provide a hydraulic system that can be retrofitted onto existing rams with wedge locks that presently do not operate using only the open and close ports and instead require additional ports to move a wedge to lock the ram in position in case of loss of hydraulic fluid power.

BRIEF DESCRIPTION OF THE DRAWINGS

The above general description and the following detailed description are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DESCRIPTION OF A PRESENTLY PREFERRED EMBODIMENT

Detailed descriptions of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Referring to FIGS. 1-4, the present invention is advantageous as it operates by applying hydraulic pressure using only the close port or open port to close the rams or the open port to open the rams, which is typical operation of rams. However, advantageously in accord with the present invention only these two ports are needed to close and also to lock the rams or to unlock and open the rams in a sequence that does not interfere with opening and closing the rams.

Accordingly, the hydraulic fluid activates a lock, in this case a wedge lock that comprises wedge 14 and tail rod extension 16, to lock the rams when fully closed in the event that hydraulic power is lost. In this way, if hydraulic power is lost then wellbore 34 (See FIG. 3) remains sealed. The method also unlocks the wedge lock before the rams open. Specific hydraulic sequencer valves/locks are shown but other types of locks and sequencer valves with cams, plungers, or other mechanical switches could be used.

The following is a description of the operation for the closing and opening sequences for the present invention.

Figure 1:
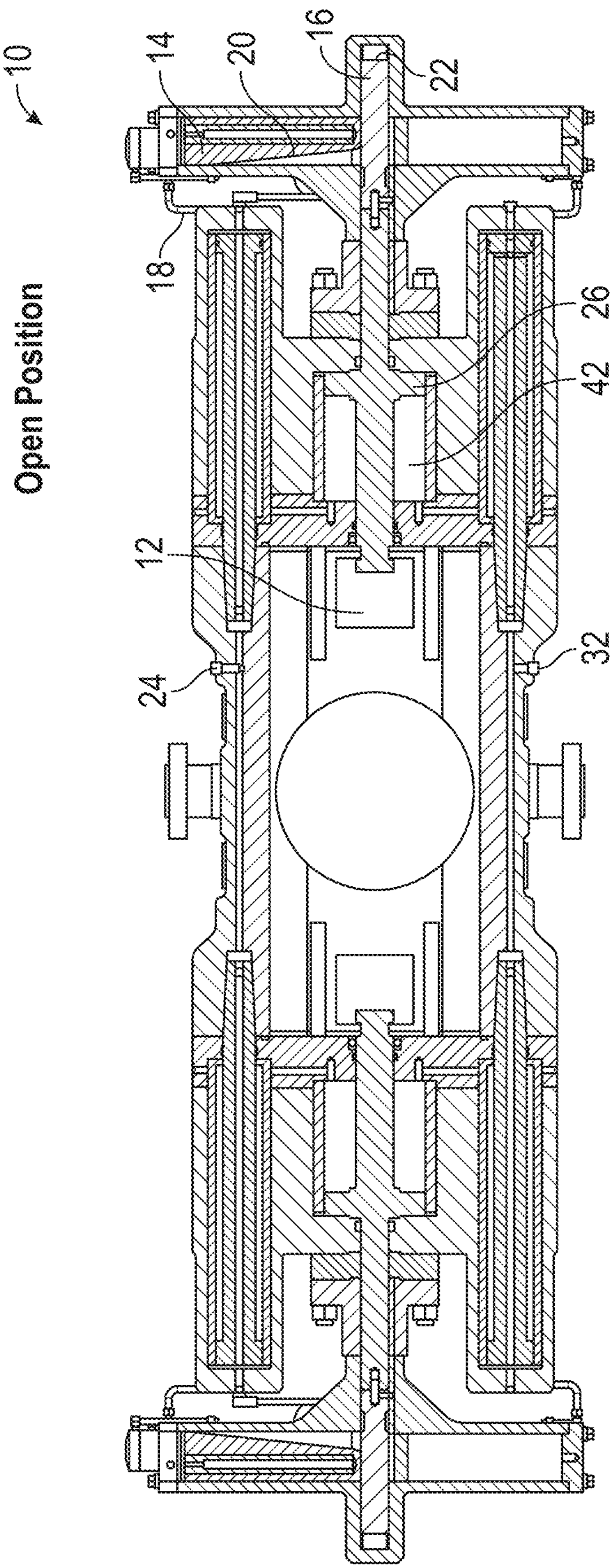
FIG. 1 is a top view, partially in section, of a hydraulic ram having wedge and tailrod extension that form a wedge lock configuration that is currently in the fully open position in accord with one embodiment of the present invention.

FIG. 1 shows a ram body 10 with rams 12 in the open position. Only one side of the system is discussed as the other side is a mirror image. It can be seen that the wedge 14 is moved away from the tail rod extension 16 within a wedge lock chamber 44. The wedge and extension tail rod form a wedge lock.

As shown, the wedge lock chamber 44 is defined within hydraulically operated housing 18. The wedge 14 is in an unlocked position in FIG. 1. The tail rod extension 16 is extended out through wedge lock chamber 44 and the wedge 14 is out of the way of the tail rod extension 16 within the wedge lock chamber 44. It will be seen that the wedge 14 has a tapered surface 20 that matches a corresponding tapered surface 22.

Figure 2:
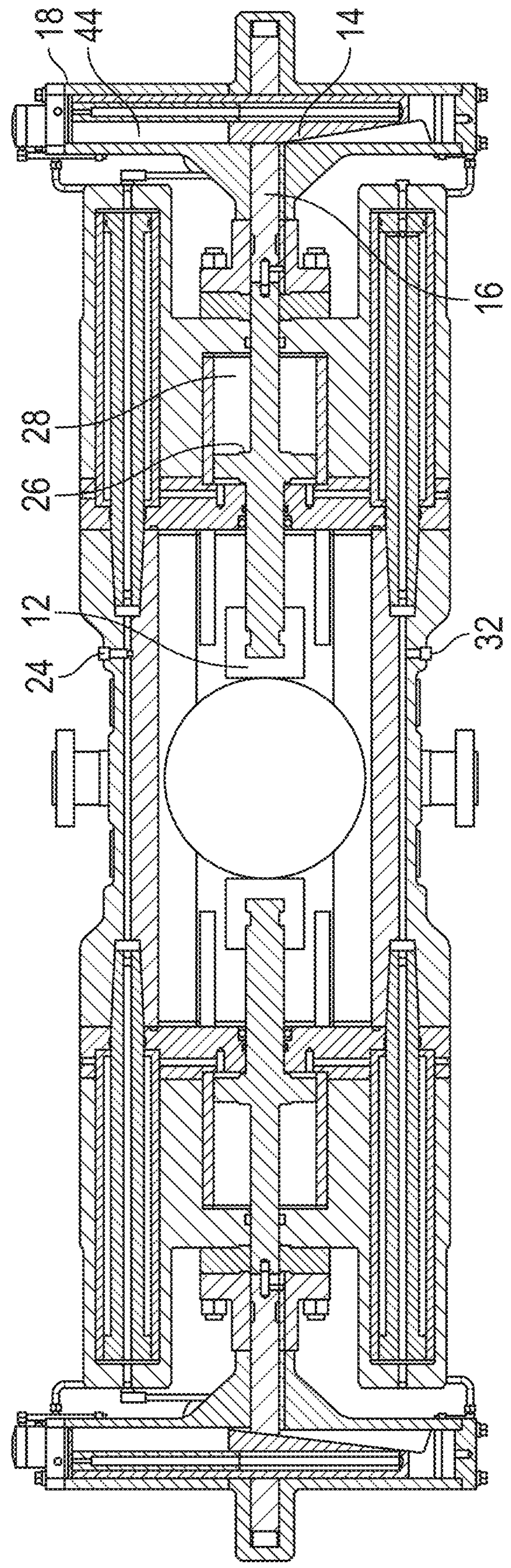
FIG. 2 is a top view, partially in section, of a hydraulic ram having wedge and tailrod extension that form a wedge lock configuration that is currently in the fully closed position in accord with one embodiment of the present invention.
Figure 3:
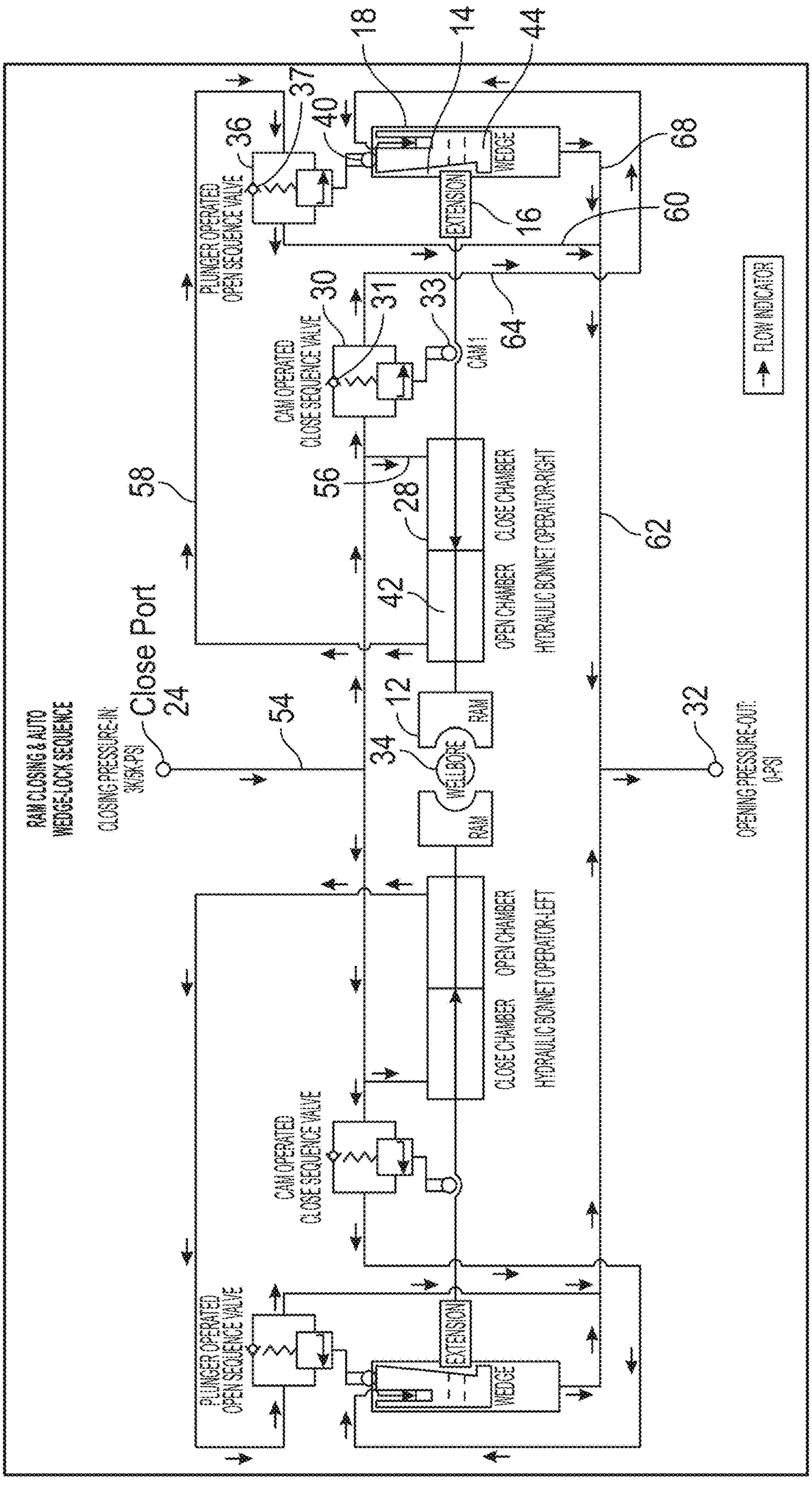
FIG. 3 is a hydraulic system diagram with the hydraulic ram having a wedge and tailrod extension that form a wedge lock configuration that operates to move the ram from the open position to the close position that shows hydraulic fluid flow for closing the rams and then subsequently locking the wedge lock utilizing a first cam operated sequence valve in accord with one embodiment of the present invention.
Figure 4:
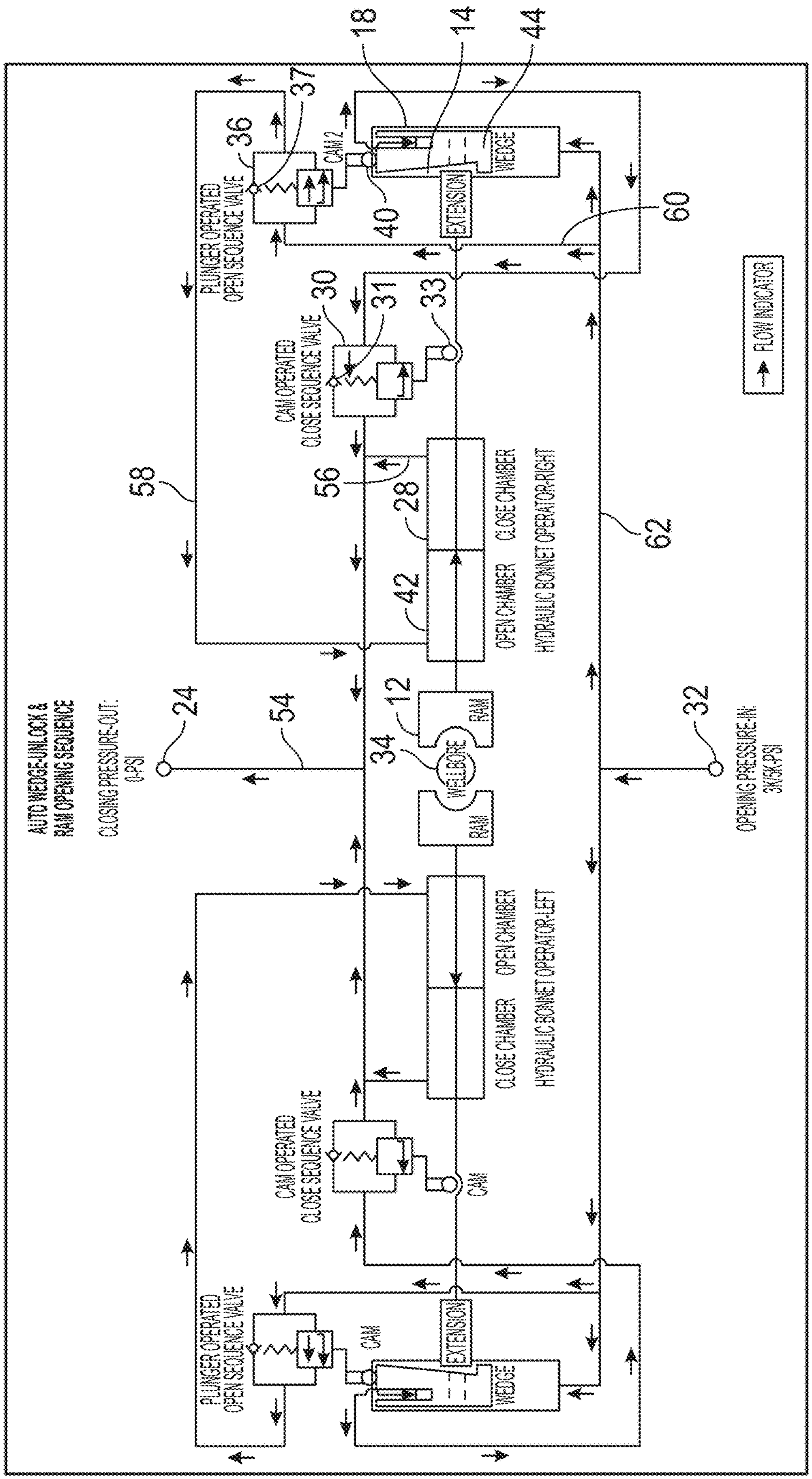
FIG. 4 is a hydraulic system diagram of a hydraulic ram with wedge and tailrod extension that form a wedge lock configuration that operates to move the ram and wedge lock from the closed position and shows hydraulic fluid flow for unlocking the wedge lock and then subsequently opening the rams utilizing a second cam operated sequence valve in accord with one embodiment of the present invention.

Hydraulic fluid to close the ram is applied to close port 24. In this way, to close the ram the operator directs hydraulic fluid through the close port 24 to a close chamber 28 to close the ram. The close chamber 28 is better seen in FIG. 2 and is also shown in FIG. 3 and FIG. 4. When this happens, hydraulic fluid is applied to piston 26 that moves the ram 12 to the closed position as shown in FIG. 2. As better shown in FIG. 2, the hydraulic pressure flows into close chamber 28 to move the ram 12 to the closed position. Only when the ram is in the fully closed position, the wedge 14 is then hydraulically moved to the locking position that wedges against the end of tail rod extension 16 so that the wedge lock comprising the wedge and tail rod is in a locked position as shown in FIG. 2.

In more detail of the hydraulic system that accomplishes this, referring to the hydraulic system of FIG. 3, and looking only at the right hand side of the drawings for the closing sequence because the left hand is a duplicate. To close the rams, hydraulic fluid flows from the close port 24 to the close chamber 28 through lines 54, 56. Once the piston fully closes the ram 12, it will activate a first cam operated sequence valve 30 in response to the cam switch 33, as indicated by the circle 33, being triggered. This may also be called first switch 33 that is activated by movement of the ram to the fully closed position. The first cam operated sequence valve 30 will then open. Hydraulic fluid flows through the first cam operated sequence valve 30 through line 64 to move the wedge 14 to the locked position. The wedge 14 locks against the tail rod extension 16 of the piston shaft as shown in FIG. 2. The end surface of the tail rod extension 16 is angled to match the angle of the wedge 14.

The wedge will not move further than shown and will remain in place if hydraulic fluid pressure is lost. In this way, the rams will not inadvertently open. It will be noted that this entire sequence occurred by applying hydraulic fluid only to close port 24.

During closing of the ram 12, the hydraulic fluid also flows out of the open chamber 42 through line 58 to the one way valve 37 of second sequencer valve 36 and specifically one way valve 37 to the open port 32.

To close the rams utilizing the hydraulic system 52 as shown in FIG. 3 hydraulic fluid is directed to flow lines 54, 56. Hydraulic fluid flows only into close chamber 28 because the first sequence valve 30 is closed. In other words the first sequence valve 30 is connected to initially block hydraulic fluid flow therethrough. Thus the close port 24 is in fluid communication with the close chamber 28. To close the ram, hydraulic fluid is directed through the close port 24 to close chamber 28. As hydraulic fluid flows into close chamber 28 from flow lines 54, 56 to move the ram 12 to the closed position, the hydraulic fluid flows through line 58 from open chamber 42 through second sequencer valve 36 to line 60 and 62 to the open port 32.

During closing, the discharged hydraulic fluid will flow out of the open chamber 42 through the second plunger operated sequence valve and specifically one way valve 37 and then to the open port 32.

Once the ram 12 is fully closed, cam switch 33 of first sequencer valve 30 opens to allow fluid to flow through line 64 to move wedge 14 to the locked position as shown in FIG. 2. As the wedge 14 moves, hydraulic fluid flows out of wedge lock chamber 44 though line 68 and 62 to open port 32.

To summarize, initially rams 12 are open as shown in FIG. 1, the wedge 14 is unlocked. To close the rams 12 and activate the wedge lock comprising wedge 14 and tail rod extension 16:

- a. Pressure is applied to the close port 24 to start the sequence to close rams 12.
- b. The Operating piston 26 strokes to fully close rams 12. This also moves tail rod extension 16 inwardly to provide room for movement of wedge 14.
- c. Only after the operating piston is fully stroked, the first sequencing valve 30 is then actuated to move and lock wedge 14 against tail rod extension 16.
- d. In this way, the Operating fluid from close port 24 pressurizes the wedge chamber to move and lock the wedge 14 against tail rod extension 16 as shown in FIG. 2. A wedge-lock is formed that is comprised of wedge 14 and tail rod extension 16. The sequence provides that the ram movement does not interfere with the wedge lock.

To open the rams 12, the rams are initially closed as shown in FIG. 2 and the wedge-lock is locked as also shown in FIG. 2. The wedge is in the locked position as shown with the wedge engaging the extension from the piston. Referring to the hydraulic system of FIG. 4, to open the rams, opening pressure is applied to the open port 32. Fluid flows to the wedge-lock chamber 44 to move the wedge 14 to the unlocked position as shown in FIG. 1. The second sequencing valve 36 utilizes a plunger activation cam 40 as a switch that opens the plunger operated second sequence valve 36 once the wedge has reached the unlocked position for fluid flow through second sequence valve 36. Only after the wedge 14 has reached the unlocked position as shown in FIG. 1, the hydraulic fluid can then flow through the second sequence valve 36 and hydraulic line 58 to the open chamber 42. Thus the wedge 14 is moved before the ram 12. The second sequence valve 36 may also be referred to as a plunger operated sequence valve. The hydraulic fluid through second sequence valve 36 moves the rams 12 to the open position as shown in FIG. 1.

As the ram pistons open, hydraulic fluid is discharged from the close chamber 28 to the close port 24.

To summarize basic operation, when the rams 12 are closed, and the wedge locks are locked as shown in FIG. 2, to open the rams 12 and disengage the wedge lock:

- a. Pressure is applied through the open port 32 to start the sequence to open rams 12.
- b. Operating pressure initially flows only to wedge lock open chamber 44 to unlock the wedge 14.
- c. Only after the wedge 14 is moved to the position shown in FIG. 1, then switch 40 is engaged so the wedge 14 is unlocked, the second sequencer valve 36 is activated by switch 40 to allow hydraulic flow to open the rams 12.
- d. The opening hydraulic pressure then flows to open chamber 42 to open the rams.

With respect to operations of the hydraulic system for the open sequence shown in FIG. 4, from the closed position as shown in FIG. 2, the hydraulic fluid is applied to open port 32. The fluid flows through line 62 to the wedge lock chamber 44 to move the wedge 14 to the unlocked position. The return fluid from wedge lock chamber 44 flows though line 64 and through first sequencer valve 30, and through flow line 56, 54 out of close port 24. First sequencer valve 30 comprises one-way valve 31 that allows fluid flow in the direction of the arrows through first sequencer valve 30. First sequencer valve 30 may also be referred to as a first cam operated sequence valve.

The invention claimed is:

1. A hydraulic method for opening and closing a ram and operating a wedge lock and unlock mechanism using only an open port and a close port, comprising:

to close the ram a hydraulic fluid flow is directed through the close port to a close chamber to close the ram and only after the ram is fully closed a first switch is activated to allow a first sequence valve to direct the hydraulic fluid flow to a wedge, the wedge is moved by the hydraulic fluid flow to lock against an extension tail rod whereby the ram is locked even with a loss of hydraulic fluid power; and to open the ram, the hydraulic fluid flow is directed through the open port to the wedge, once the wedge moves to an open position a second switch is activated so that a second sequence valve directs the hydraulic fluid flow to an open chamber to open the ram.

2. The method of claim 1, further comprising to close the ram, the hydraulic fluid flow is also directed from an open chamber to the second sequence valve that permits the hydraulic fluid flow to the open port.

3. The method of claim 2, further comprising to close the ram a first sequencer valve initially prevents the hydraulic fluid flow through the first sequencer valve until the first switch is activated after the ram is fully closed.

4. The method of claim 1, further comprising to open the ram the hydraulic fluid flow is directed out of the close chamber to the close port.

5. The method of claim 1, further comprising retrofitting an additional hydraulic fluid port other than the open port and the close port onto a ram system to allow operation of rams and a wedge using only the open port and the close port.

6. A hydraulic method for opening and closing a ram and operating a lock and unlock mechanism using only an open port and a close port, comprising:

to close the ram, a hydraulic pressure is directed through the close port to a close chamber to close the ram, the ram being urged to a closed position thereby activating a first switch, the first switch then opening a first valve to direct the hydraulic pressure to a lock, the lock being urged from an unlocked position to a locked position, the lock then engaging an extension of the ram to maintain the ram in the locked position; and to open the ram, the hydraulic pressure is directed through the open port to the lock, the lock being urged to the unlocked position whereby the lock activates to a second switch, the second switch then opening a second valve to direct the hydraulic pressure to an open chamber to open the ram.

7. The method of claim 6, further comprising to close the ram, the ram being connected to an extension comprising a shaft and a recess along the shaft.

8. The method of claim 7, further comprising the first switch is activated upon engaging the recess and the first switch is deactivated upon disengaging the recess.

9. The method of claim 8, further comprising to close the ram the first valve initially prevents the hydraulic pressure through the first valve until the first switch is activated after the ram is fully closed.

10. The method of claim 8, further comprising the first switch is cam operated.

11. The method of claim 6, further comprising to open the ram the hydraulic pressure is directed out of the close chamber to the close port.

12. The method of claim 6, further comprising the lock being a wedge lock whereby the wedge lock comprises a wedge with a first angle and the extension comprises a second angle, the first angle and the second angle being reciprocal.

13. The method of claim 6, further comprising to open the ram, the second switch being activated upon engagement of the lock in the unlocked position and second switch being deactivated upon disengagement of the lock.

14. The method of claim 13, further comprising the second switch being cam operated.

15. The method of claim 6, further comprising retrofitting an additional hydraulic fluid port other than the open port and the close port onto a ram system to allow operation of rams and a lock using only the open port and the close port.

16. A hydraulic method for opening and closing rams and operating a lock and unlock mechanism using only an open port and a close port;

to close the rams and lock the rams in a closed position, hydraulic fluid is directed to the close port to close the rams, then only after the rams are in a fully closed position the hydraulic fluid is directed to the lock and unlock mechanism which is then moved to a locked position;

to open the rams, hydraulic fluid is directed to the open port whereupon the lock and unlock mechanism is moved to an unlocked position; and then only after the lock and unlock mechanism is moved to a fully unlocked position, the hydraulic fluid is directed to open the rams.

17. The method of claim 16, further comprising to close the rams, upon the rams being urged to the fully closed position the rams then activating a first switch, the first switch then opening a first valve to direct the hydraulic fluid to the lock and unlock mechanism, to open the rams, the hydraulic fluid is directed through the open port to the lock and unlock mechanism, the lock and unlock mechanism being urged to the fully unlocked position activating a second switch, the second switch then opening a second valve to direct the hydraulic fluid to open the rams.

18. The method of claim 16, further comprising retrofitting an additional hydraulic fluid port other than the open port and the close port onto a ram system to allow operation of rams and a lock using only the open port and the close port.

* * * * *